US008954516B2

(12) United States Patent
Hartwich et al.

(10) Patent No.: US 8,954,516 B2
(45) Date of Patent: Feb. 10, 2015

(54) METHOD AND FILTER SYSTEM FOR STORING INFORMATION ABOUT MESSAGES COMING IN VIA A SERIAL DATA BUS OF A COMMUNICATION NETWORK IN A USER OF THE NETWORK

(75) Inventors: Florian Hartwich, Reutlingen (DE); Franz Bailer, Moessingen (DE); Christian Horst, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 12/922,073

(22) PCT Filed: Mar. 6, 2009

(86) PCT No.: PCT/EP2009/052667
§ 371 (c)(1),
(2), (4) Date: Dec. 14, 2010

(87) PCT Pub. No.: WO2009/112434
PCT Pub. Date: Sep. 17, 2009

(65) Prior Publication Data
US 2011/0113107 A1    May 12, 2011

(30) Foreign Application Priority Data

Mar. 10, 2008  (DE) .......................... 10 2008 000 583

(51) Int. Cl.
*G06F 15/16*  (2006.01)
*H04L 12/40*  (2006.01)
*H04L 12/46*  (2006.01)

(52) U.S. Cl.
CPC ....... *H04L 12/40032* (2013.01); *H04L 12/4625* (2013.01); *H04L 2012/40215* (2013.01)
USPC ............ 709/206; 709/250; 370/352; 370/447

(58) Field of Classification Search
CPC ...................... H04L 12/40032; H04L 12/4625
USPC ........................... 709/206, 250; 370/352, 447
See application file for complete search history.

(56) References Cited

U.S. PATENT DOCUMENTS

| 7,664,133 B2* | 2/2010 | Nichols .......................... 370/447 |
| 2002/0001288 A1* | 1/2002 | Fukunaga et al. ............. 370/252 |
| 2002/0026489 A1* | 2/2002 | Homma ........................ 709/206 |
| 2003/0051061 A1* | 3/2003 | Hank et al. .................... 709/250 |

(Continued)

FOREIGN PATENT DOCUMENTS

| DE | 101 43 356 | 3/2003 |
| JP | 2003-110608 | 4/2003 |

(Continued)

*Primary Examiner* — Razu Miah
(74) *Attorney, Agent, or Firm* — Kenyon & Kenyon LLP

(57) ABSTRACT

A method and a filter system for storing information about messages coming in via a serial data bus of a communication network in a communication module of a user connected to the data bus, which are filtered using a filter system. In order to be able to implement a particularly simple and efficient storage of information about incoming messages even in the event of a great number of filter criteria, the invention provides for the filter system to include a list, which as list elements has one or multiple filter elements, which contain storage control information, and for a check to be performed on the basis of the storage control information as to whether information about an incoming message is to be stored, and information about an incoming message is stored if the check has determined that the information is to be stored.

20 Claims, 5 Drawing Sheets

(56) References Cited

U.S. PATENT DOCUMENTS

| | | | |
|---|---|---|---|
| 2003/0123446 A1* | 7/2003 | Muirhead et al. | 370/392 |
| 2004/0008669 A1* | 1/2004 | Bos et al. | 370/352 |
| 2004/0181586 A1* | 9/2004 | Morreale et al. | 709/206 |
| 2005/0117593 A1* | 6/2005 | Shand | 370/401 |
| 2005/0239494 A1* | 10/2005 | Klassen et al. | 455/550.1 |
| 2006/0098682 A1* | 5/2006 | Nichols | 370/447 |
| 2006/0168010 A1* | 7/2006 | Vill et al. | 709/206 |
| 2006/0171410 A1* | 8/2006 | Jung et al. | 370/447 |
| 2006/0182085 A1* | 8/2006 | Sweeney et al. | 370/352 |
| 2006/0224750 A1* | 10/2006 | Davies et al. | 709/229 |
| 2007/0043817 A1* | 2/2007 | Oliver et al. | 709/206 |
| 2008/0104190 A1* | 5/2008 | Morreale et al. | 709/206 |
| 2008/0263159 A1* | 10/2008 | Choi | 709/206 |
| 2010/0054159 A1* | 3/2010 | Zhu et al. | 370/259 |

FOREIGN PATENT DOCUMENTS

| | | |
|---|---|---|
| JP | 2005-328119 | 11/2005 |
| JP | 2005-337017 | 12/2005 |

* cited by examiner

METHOD AND FILTER SYSTEM FOR STORING INFORMATION ABOUT MESSAGES COMING IN VIA A SERIAL DATA BUS OF A COMMUNICATION NETWORK IN A USER OF THE NETWORK

FIELD OF THE INVENTION

The present invention relates to a method for storing information about messages coming in via a serial data bus of a communication network in a communication module of a user connected to the data bus, which are filtered using a filter system. For this purpose, the messages respectively have an identifier for identification. The properties of the information storage are defined by identifiers of messages stored in at least one list of the filter system. The present invention also relates to a filter system for a communication module of a user connected to a serial data bus of a communication network for implementing the mentioned method.

BACKGROUND INFORMATION

There are communication networks that are discussed in the related art in which messages are transmitted in accordance with serial communication protocols (e.g. Controller Area Network (CAN), FlexRay, Local Interconnect Network (LIN), Media Oriented Systems Transport (MOST)). The networks include at least one data bus, to which multiple user nodes are connected. In these communication networks, it is further understood not to use all of the messages sent over the data bus from all of the user nodes connected to the data bus. The user nodes each include one communication module and one application. To relieve the host application in the user nodes, many communication modules only forward those messages to the application that will indeed be used in the application. For this purpose, the messages are detected on the basis of their numeric identifier. This method is called acceptance filtering. The known methods for acceptance filtering include lists of identifiers that are to be allowed through (so-called acceptance codes). Parts of the identifiers may be masked out for the purpose of filtering such that each list entry may stand for a group of identifiers (so-called acceptance mask). To this end, respectively n bits of the identifier may be masked out by a mask such that the identifier stands for a group of $2^n$ identifiers. The known method may be varied by lists of identifiers, which are not to be accepted, that is, which are to be blocked. These lists are configurable by software.

If an application uses messages from a broad spectrum of identifiers, it may happen that the filter options of the hardware communication module are insufficient to allow all required messages to pass through and at the same time to block all superfluous messages. For the remaining acceptance filtering, the application software must then expend processing power of the processing unit (e.g. central processing unit; CPU) of the user node. In addition, other sizes of the groups defined by the acceptance masks are possible only by overlap in that multiple list entries are considered simultaneously and combined. This requires time and hardware resources, however. Another disadvantage of filtering using acceptance codes and acceptance masks is the danger that desired messages are inadvertently rejected. To prevent this, the acceptance mask is usually opened very wide, which has the consequence that messages are accepted that are actually not used by the application. As a result, the application software bears additional load (frequent operation of the FIFO for retrieving the message, filtering the message etc.).

SUMMARY OF THE INVENTION

An objective of the exemplary embodiments and/or exemplary methods of the present invention is to implement an acceptance filtering having a great number of filter criteria and using the least possible expenditure.

To achieve this objective, the exemplary embodiments and/or exemplary methods of the present invention provide for storing multiple pairs of identifiers in the at least one list of the filter system, which in each case define one range delimited by a first identifier and a second identifier; for the identifier of an incoming message to be compared at least to selected identifier pairs and for a query to be made as to whether the identifier of the incoming message is greater than or greater than or equal to the selected first identifier and smaller than or smaller than or equal to the selected second identifier; and for the incoming message to be forwarded to the application or rejected if the identifier lies within the range delimited by the first identifier and the second identifier.

The filter method according to the present invention thus does not us a list of individual identifiers and optional acceptance masks, but rather a list of pairs of identifiers. The provided method defines an identifier pair as a band pass (a so-called acceptance filter) or as a band stop (a so-called rejection filter). All identifiers of received messages, the numerical values of which are between the two numerical values (the first and second identifier) of the identifier pair, are accepted (band pass) or rejected or disallowed (band stop). It is possible to consider multiple identifier pairs sequentially until a matching pair is found or until the end of the list is reached.

The advantage of the range filter according to the present invention lies in the fact that the identifier pairs may be considered independently of each other and that the breadth of the filter ranges may be defined at will. The filter system may be implemented in hardware. The identifier pairs may be considered sequentially starting with a specific identifier pair, in particular starting at the beginning of the list. This has the advantage that the control of the filter method and the access to the list contents are designed in a simple and resource-saving manner and that the identifier pairs may be stored in a random access memory (e.g. RAM), but also in a read-only memory (ROM and its variations (PROM, EPROM, EEPROM)) and do not have to be implemented in (flip-flop) registers.

Advantageous refinements of the exemplary embodiments and/or exemplary methods of the present invention may be gathered from the further description herein and are explained in greater detail below with reference to the figures.

BRIEF DESCRIPTION OF THE DRAWINGS

FIG. 3 shows an example of a filter element of a list of the filter system according to the present invention for 11 bit identifiers of CAN messages.

FIG. 4 shows an example of a filter element of a list of the filter system according to the present invention for 29 bit identifiers of CAN messages.

DETAILED DESCRIPTION

Figure 1:
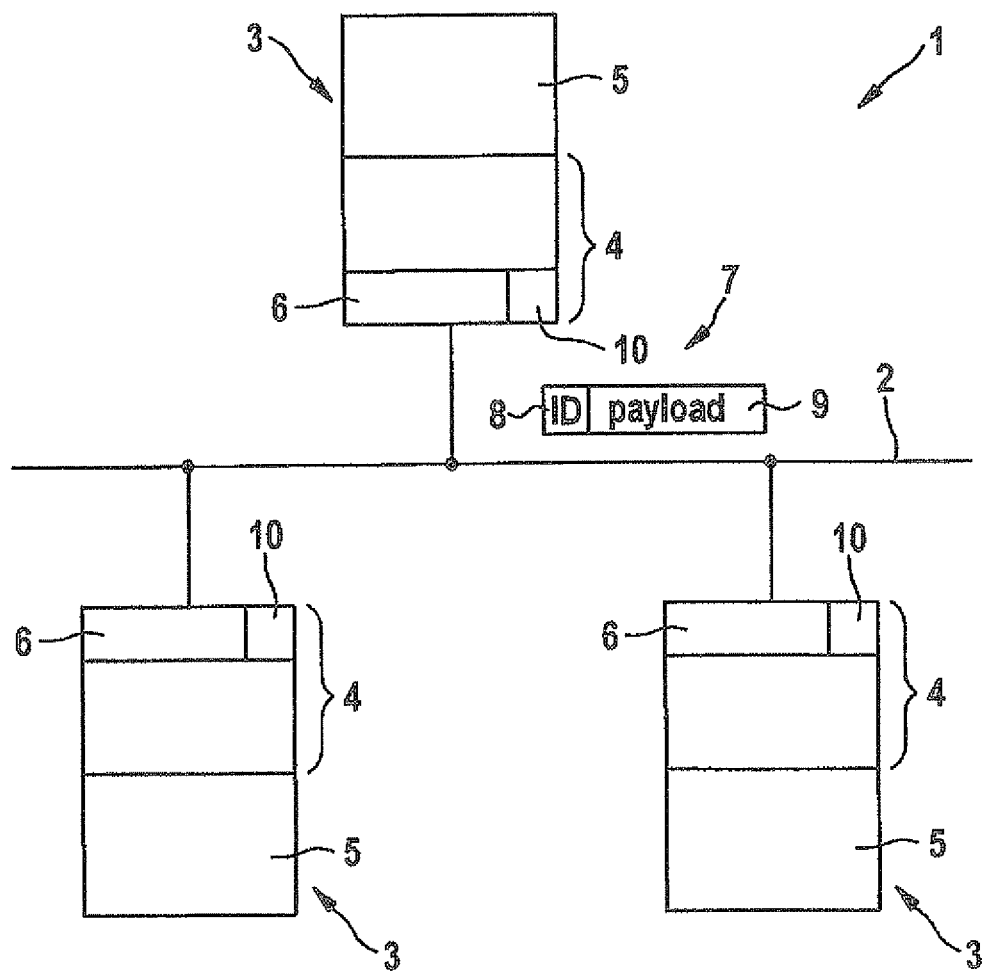
FIG. 1 shows an example of a communication network having user nodes, which have a filter system according to the present invention.

In FIG. 1, a communication network according to the present invention is designated in its entirety by reference symbol 1. Network 1 includes a data bus 2, which is represented symbolically by a single line. Multiple user nodes 3 are connected to data bus 2, only three of which are represented in FIG. 1 by way of example. Each node 3 is connected to data bus 2 via a communication module 4. Nodes 3 additionally have a host application 5.

Messages 7 may be transmitted via data bus 2 according to a serial communication protocol (e.g. CAN, FlexRay, LIN, MOST among others). Communication module 4 is responsible for receiving and transmitting messages 7 via data bus 2. Since not all of the messages 7 transmitted via bus 2 are utilized by all nodes 3 connected to bus 2, communication modules 4 have a filter system 6. Filter system 6 only allows those messages 7 to pass through to application 5 that are intended for the respective node 3 and are actually utilized in the application 5 of node 3.

Messages 7 each have an identifier 8, which allows for a definite identification of messages 7. In the case of CAN, identifier 8 is a kind of sender address for example, which makes it possible to ascertain the origin of message 7 and which indicates the content of message 7. In addition to identifier 8, messages 7 also have a payload data part 9. The filter method implemented by filter system 6 is also called acceptance filtering.

The exemplary embodiments and/or exemplary methods of the present invention relates to the further development of filter system 6 such that a particularly high number of filter criteria may be implemented with relatively little effort. The acceptance filtering begins to work when a new message 7 has been received. Identifier 8 of received message 7 (a numerical value) is compared to a list of configured identifier pairs in order to decide whether received message 7 is forwarded to application software 5 or whether message 7 is disallowed.

The implementation may be done in hardware. An aspect of the exemplary embodiments and/or exemplary methods of the present invention relates to at least one list, which is stored in a memory element 10 of filter system 6. Memory element 10 may be developed as a random access memory (e.g. RAM) or as a read-only memory (e.g. Flash memory, ROM, EEPROM). The at least one list includes, for example, 128 entries each having a length of 32 bits. Of course, the list may also have a greater or smaller number of entries (e.g. 256 or 64) or entries having a greater or smaller length (e.g. 64 or 16 bits). A word length of 64 bit would have the advantage that e.g. for extended 29 bit CAN identifiers one identifier pair including configuration bits could be accommodated in one data word such that both identifiers of the identifier pair could be read in in one single read operation.

Multiple identifier pairs are stored in the list, which in each case define a range delimited by a first identifier ID1 and a second identifier ID2. Identifier 8 of an incoming message 7 is compared successively with identifier pairs from the list, starting with a specific identifier pair from the list, which may be the first list entry, until a range defined by an identifier pair is found, in which identifier 8 of message 7 is located. In this case, incoming message 7 is then—depending on the configuration—either forwarded to application 5 or rejected. The identifier pairs from the list may be sequentially compared to identifier 8 of incoming message 7. If no range defined by an identifier pair can be found in the list, within which identifier 8 of message 7 is located, then incoming message 7 may be either, forwarded to application 5 or rejected, depending on the configuration.

The advantage of the method lies in the fact that the identifier pairs can be considered independently of each other in sequence and that the breadth of their filter ranges can be configured at will. Since the identifier pairs are considered sequentially, they may be stored in a random access memory or in a read-only memory and do not have to be implemented in flip-flop registers. This allows for a simple and cost-effective implementation of the exemplary embodiments and/or exemplary methods of the present invention.

In the exemplary embodiments and/or exemplary methods of the present invention, the comparison identifiers exist as a list of identifier pairs, which are stored in a memory element 10. Memory 10 is typically implemented as RAM, but non-volatile memories (NVRAM, Flash memories, FeRAM, MRAM, PCRAM) are also possible for special applications. The number of identifier pairs may be set freely. For each identifier pair it is defined whether it acts as a band pass (a so-called acceptance filter) or as a band stop (a so-called rejection filter). The two numerical values of an identifier pair may be identical, in which case the identifier pair acts only on one specific message. Acceptance filters 6 or the content of the at least one filter list and the received messages may be stored in the same memory, and the distribution of the memory space between filters and messages is configurable.

The memory area required for an identifier pair depends on the communication protocol. For 11 bit CAN identifiers, one identifier pair may be accommodated in an e.g. 32 bit data word. For 29 bit CAN identifiers, an identifier pair may be accommodated in e.g. two 32 bit data words, respectively including configuration bits, which define for example whether the pair acts as a band pass or as a band stop. In order to save memory space in some applications, it is optionally possible to replace identifier pairs in the list, whose two numerical values are identical, with individual identifiers. In CAN applications, separate lists may be provided for data frames and remote frames as well as for 11 bit identifiers and for 29 bit identifiers. The provided acceptance filter method may also be combined with masks, which partially mask out the identifiers for filtering. It is also conceivable to combine the provided range filter method with other known filter methods. A combination with a so-called classic filter would be conceivable for example, in which the identifier 8 of the incoming message 7 is compared to at least one acceptance identifier (a so-called acceptance code) and/or to at least one acceptance mask. A first identifier contained in the list may be used as an acceptance identifier and a corresponding second identifier contained in the list is used as an acceptance mask. A combination of the provided range filter method with a so-called dual ID filter would also be conceivable. For this purpose, both identifiers stored in the list are compared to identifier 8 of received message 7.

Figure 2:
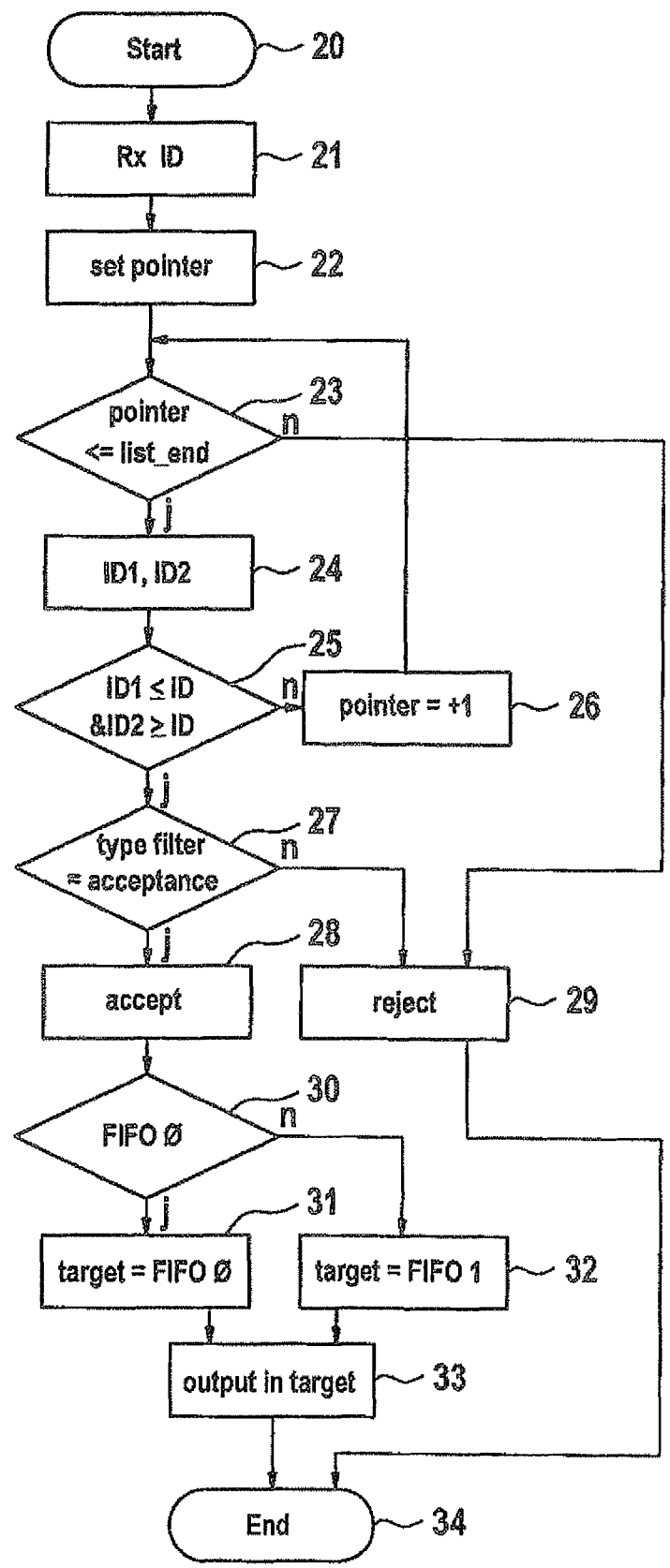
FIG. 2 shows an example of a flow chart of a filter method according to the present invention.

In the following, the method according to the present invention is described in greater detail on the basis of the flow chart from FIG. 2. The method begins in a functional block 20. The acceptance filtering begins to work when a new message 7 has been received. Subsequently, identifier (ID) 8 of an incoming message 7 is read in a functional block 21.

In a functional block 22, a pointer is set to a specific location in the list, which may be to the first identifier pair at the beginning of the list. As input parameters, the filter logic device is provided with identifier 8 of received message 7, the pointer to the list of identifier pairs and the number of list entries (size of the list). In a query block 23 a check is performed to determine whether the pointer is still within the list.

If yes, then the logic device in a functional block 24 reads a first identifier pair from the list and checks in a query block 25 whether the numerical value of received identifier 8 is within the range defined by the identifier pair. If not, then the pointer is incremented by "1" in a functional block 26, and the method branches to query block 23. In the subsequent cycle, the next identifier pair is read out from the list and is compared to identifier 8 of received message 7. This loop is run through until the end of the list is reached ("no" in query block 23) or until a "match" exists, that is, until the numerical value of received identifier 8 lies within the range defined by the identifier pair ("yes" in query block 25).

If a "match" exists, then the method branches to a query block 27, where a determination is made as to whether the current identifier pair is to act as a band pass (acceptance). If yes, then a determination is made in functional block 28 that incoming message 7 is to be accepted. If no, then a determination is made in a functional block 29 that incoming message 7 is to be rejected. Information about whether the identifier pair is to act as a band pass or as a band stop may also be stored in the list in the form of an SFM (standard filter mode) configuration bit.

In the event that the end of the list is reached without there being a "match", that is, no matching identifier pairs were found in the list, the method in the present exemplary embodiment also branches to functional block 29. What happens in this case may be configured in advance. It is also possible to configure the system such that received message 7 is accepted in the event that no matching identifier pairs were found in the list. In this case, the method would have to branch off to functional block 28 from the "no" branch of query block 23.

From functional block 28, the method branches to another query block 30, where a check is performed to determine whether incoming message 7 is to be stored in a first buffer FIFO0, from where application 5 is then able to retrieve message 7. Thus it is conceivable, for example, to store message 7 in a different buffer depending on whether message 7 is important or unimportant, time-critical or less time-critical, or, in the case of a gateway, whether it is intended for channel A or for channel B. The list may also contain information regarding which buffer is to be used to store message 7 in the form of an SFFS (Standard Filter FIFO Select) configuration bit. A determination is then made in a functional block 31 that message 7 will be stored in first buffer FIFO0. If message 7 is not to be stored in buffer FIFO0, then the method branches to a functional block 32, where a determination is made that message 7 will be stored in second buffer FIFO1, from where application 5 is then able to retrieve message 7. The exemplary embodiments and/or exemplary methods of the present invention is not limited only to two buffers FIFO0 and FIFO1, however. When using the exemplary embodiments and/or exemplary methods of the present invention in a gateway having multiple channels, it may be practical, for example, to have more than two buffers FIFO0, FIFO1. A greater number of FIFOs having a depth of 1 would then be a so-called full CAN.

In a functional block 33, incoming message 7 is then stored in the selected buffer FIFO0 or FIFO1. The method is then ended in a functional block 34. The method is also ended if the upcoming message is to be rejected (functional block 29).

Figures 3, 4:
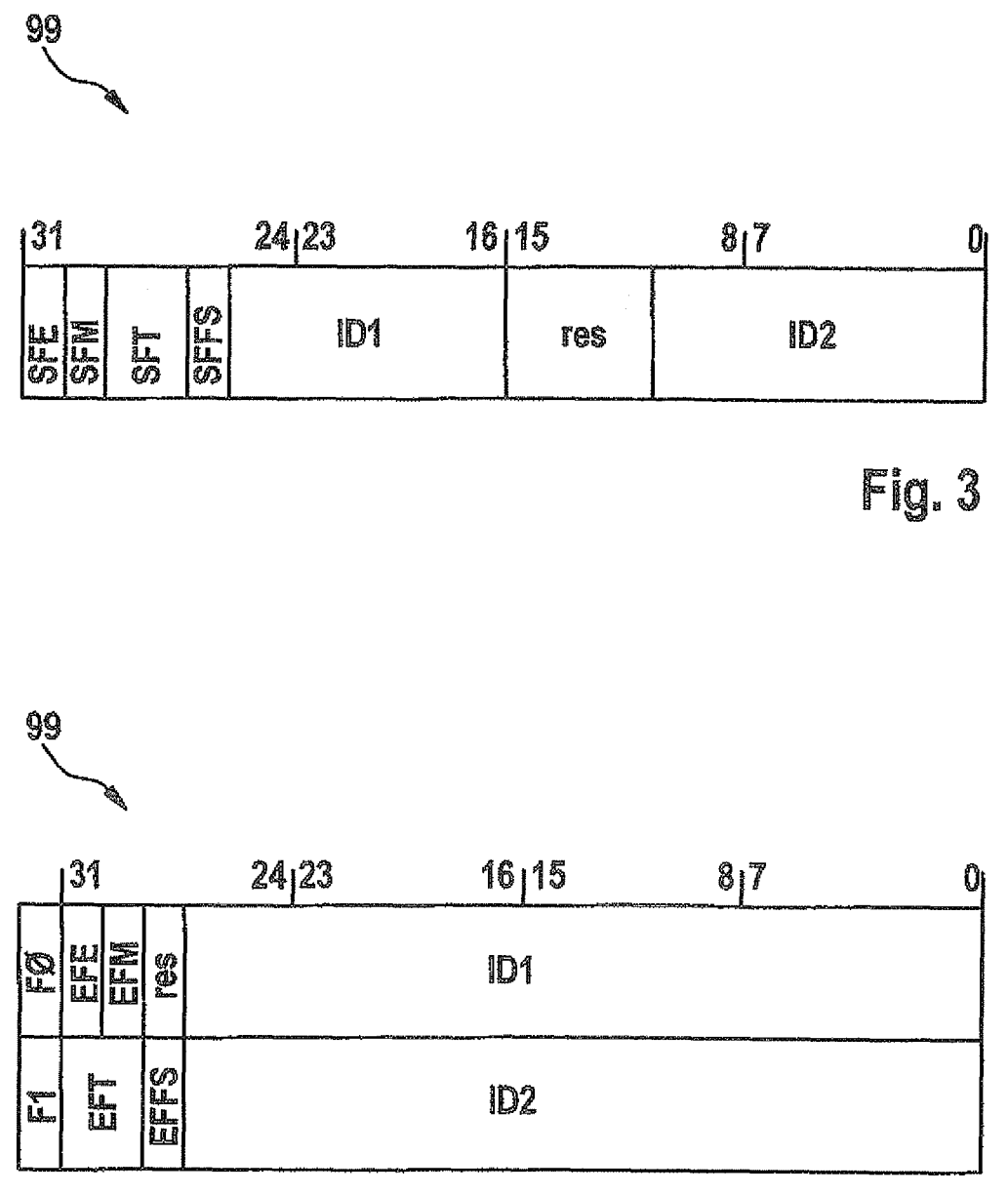

FIG. 3 shows in an exemplary manner a possible structure of a 32 bit data word of memory element 10 for a standard 11 bit CAN identifier. Bit 31 includes an SFE (Standard Filter Enable) configuration bit. All active filter elements are used for the acceptance filtering of standard data frames. The value "0" of bit 31 indicates that the filter is inactive, and the value "1" indicates that the filter is active. Bit 30 includes an SFM (Standard Filter Mode) configuration bit. The value "0" of bit 30 indicates that received message 7 will be accepted if the filtering yields a "match", and the value "1" indicates that the received message will be rejected if the filtering yields a "match".

Bits 29 and 28 include SFT (Standard Filter Type) configuration bits. The value "00" of bits 29 and 28 indicates that the filter element includes a range filter in the range from first identifier ID1 to second identifier ID2. The value "01" indicates that the filter element includes a dual ID filter for the first identifier ID1 and the second identifier ID2. The value "10" indicates that the filter element includes a classic filter, the first identifier ID1 representing an acceptance code and the second identifier ID2 representing an acceptance mask. The value "11" is reserved for future extensions of the method, for example.

Bit 27 includes an SFFS (Standard Filter FIFO Select) configuration bit. The value "0" of bit 27 indicates that an accepted message 7 is stored in a first buffer FIFO0, and the value "1" indicates that an accepted message 7 is stored in a second buffer FIFO1. The eleven bits 26 through 16 include the standard filter identifier ID1, and the eleven bits 10 through 0 include the standard filter identifier ID2. Bits 11 through 15 are reserved.

FIG. 4 shows in an exemplary manner a possible structure of two 32 bit data words of memory element 10 for an extended 29 bit CAN identifier. Bit 31 of the first data word F0 includes an EFE (Extended Filter Enable) configuration bit. All active filter elements are used for the acceptance filtering of extended data frames. The value "0" of bit 31 indicates that the filter is inactive, and the value "1" indicates that the filter is active. Bit 30 of the first data word includes an EFM (Extended Filter Mode) configuration bit. The value "0" of bit 30 indicates that received message 7 will be accepted if the filtering yields a "match", and the value "1" indicates that the received message will be rejected if the filtering yields a "match". Bit 29 of the first data word is reserved.

Bits 31 and 30 of the second data word F1 include EFT (Extended Filter Type) configuration bits. The value "00" of bits 31 and 30 indicates that the filter element includes a range filter in the range from first identifier ID1 to second identifier ID2. The value "01" indicates that the filter element includes a dual ID filter for the first identifier ID1 and the second identifier ID2. The value "10" indicates that the filter element includes a classic filter, the first identifier ID1 representing an acceptance code and the second identifier 1D2 representing an acceptance mask. The value "11" is reserved for future extensions of the method, for example. Bit 29 of the second data word includes an EFFS (Extended Filter FIFO Select) configuration bit. The value "0" of bit 29 indicates that an accepted message 7 is stored in a first buffer FIFO0, and the value "1" indicates that an accepted message 7 is stored in a second buffer FIFO1.

The 29 bits 28 through 0 of the first data word include the extended filter identifier ID1, and the 29 bits 28 through 0 of the second data word include the extended filter identifier ID2.

The method according to the present invention is particularly suitable for use in a gateway. A so-called basic CAN controller having one or multiple FIFOs may be utilized for this purpose. The gateway is connected to different data buses 2 of different networks 1. It is used for transmitting messages from a first data bus 2 of a first network 1 to a second data bus 2 of a second network 1. The gateway software may be relieved decisively by filtering messages in accordance with the present invention. In connection with a gateway, a decisive advantage of the exemplary embodiments and/or exemplary methods of the present invention also becomes particularly useful. In contrast to many normal user nodes 3, a gateway must be able to process, that is, forward, a great number of messages 7 transmitted in a network 1. For this reason, there is a particularly great number of filter criteria in the case of a gateway, which may be implemented in hardware with little effort by the exemplary embodiments and/or exemplary methods of the present invention. In addition, the exemplary embodiments and/or exemplary methods of the present invention allows for a particularly quick, efficient and resource-conserving implementation of filtering the incoming messages. The method according to the present invention may also be used for so-called full CAN controllers, in that additional configuration bits of the filter elements do not only distinguish between two FIFOs, but also sort specific messages into memories reserved for these messages (so-called "dedicated message buffers").

The above-described method may be divided into two basic steps. First, a check is performed on the basis of identifier pairs associated with the individual filter elements 99 as to whether the received message matches one of filter elements 99. To check whether the received message matches filter element 99, it is possible to use, as described above, aside from the identifier pairs of individual filter elements 99, also the SFT or EFT configuration bits stored in filter elements 99, in order to determine in the above-described manner, which filter type (range filter, dual ID filter or classic filter) is to be used as a basis for checking whether there exists a match. As soon as a filter element 99 has been found in the list that matches the received message, the first basic step is concluded.

Subsequently, in a second basic step, a determination is made on the basis of control bits of ascertained filter element 99 such as for example the mode bit (SFM or EFM) and the SFFS or EFFS bit for selecting buffer FIFO0 or FIFO1 as to what to do with the received message.

Thus the configuration bits mentioned earlier specify a range of application of the individual filter rules stored in filter elements 99, whereas the control bits specify the method of processing those messages 7, which fall in the range of application of this filter rule.

In the following, a specific embodiment of the method according to the present invention is explained with reference to FIG. 5, in which in addition to the procedural methods possible in the other specific embodiments, namely the storage of message 7 in a specific buffer FIFO0, FIFO1 or the discarding of message 7, another procedural method is provided, namely the storage of information about received message 7. Storing the information about received message 7 is independent of storing message 7 in one of buffers FIFO0, FIFO1. The information about received message 7 may even be stored if message 7 itself is not to be stored in a buffer FIFO0, FIFO1 or cannot be stored (for lack of storage space for example) in one of buffers FIFO0, FIFO1.

Figure 5:
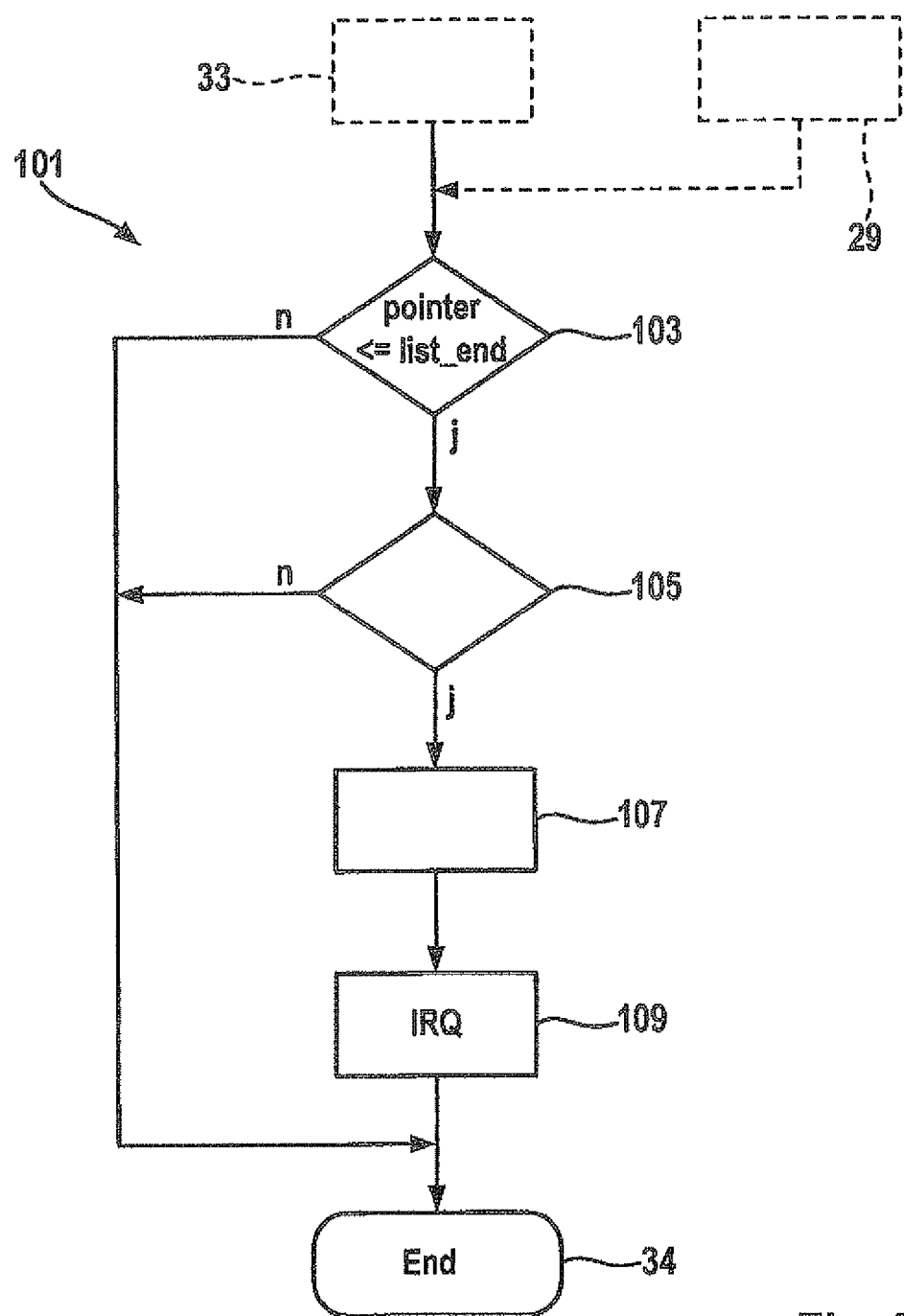
FIG. 5 shows an example of a flow chart including additional method steps of a filter method according to the present invention.

This additional procedural method may be implemented, for example, with the aid of additional method steps 101 shown in FIG. 5. Additional method steps 101 may be carried out immediately before the end 34 of the method indicated in FIG. 2. That is to say, the additional method steps 101 may be carried out after step 29 and after step 33.

Since the information about received message 7 is to be stored only in the event that a matching filter element 99 has been found, first a check is performed in a branch 103 as to whether the pointer still points to a range within the list. If this is the case (y), then in another branch 105 additional control information—referred to as storage control information in the following—is checked to determine whether information about received message 7 is to be stored. Otherwise (n), the method branches to step 34. Information stored in ascertained filter element 99 may be checked as storage control information. For example, the additional control information may include one bit within the filter element 99 shown in FIG. 3 or in FIG. 4 or may be formed by such a bit. For example, one of the bits indicated as reserved by "res" in FIG. 3 or 4 may be checked to determine whether information about received message 7 is to be stored. The storage control information thus introduces an additional option into filter elements 99 that makes it possible to store information about incoming messages 7 using a specific identifier.

If the check of the storage control information in step 105 reveals that the information about incoming message 7 is to be stored, then the method proceeds (y) with a step 107, otherwise (n) the system branches to step 34 in order to terminate the method.

The information about received message 7 is stored in step 107. This information may indicate the ascertained filter element 99, which matches received message 7. For example, it is possible simply to store the pointer indicated as "pointer" in the figures. Furthermore, it is possible to store whether and in which buffer FIFO0, FIFO1 the received message 7 was stored in the preceding step 33. In order to be able to access stored message 7 directly, there may be a provision to store information about the location at which received message 7 was stored within the respective buffer FIFO0, FIFO1. Furthermore, information may be stored about whether received message 7 was not stored for the reason that no more storage space was available in the respective buffer FIFO0, FIFO1. Finally, information may be stored about whether storage was not provided for at all, for example because the SFM or EFM bits of ascertained filter element 99 are set accordingly.

Subsequently, an interrupt request (IRQ) is generated in a step 109 in order to signal to application 5 that the above-mentioned information about received message 7 has been stored. Application 5 is then able to retrieve the stored information and, if applicable, read message 7 out of buffer FIFO0, FIFO1. A specific embodiment that is not shown does not provide for step 109, and the method does not generate an interrupt request.

Finally, the method is terminated in step 34.

Figure 6:
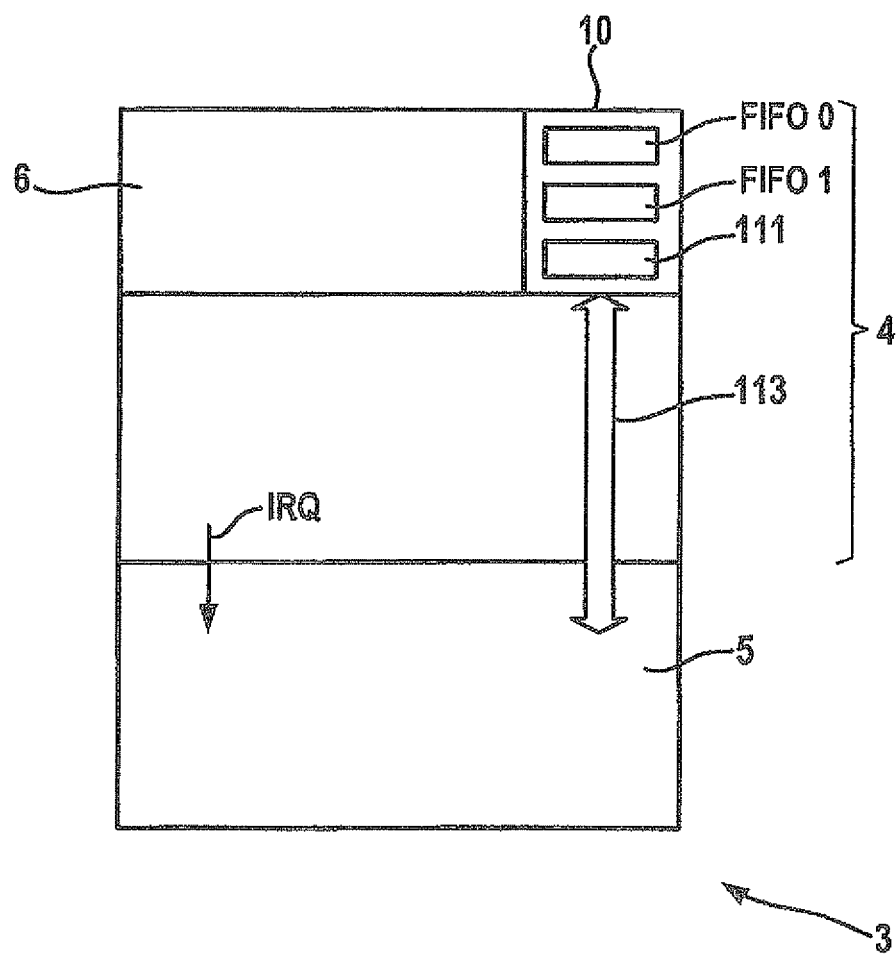
FIG. 6 shows a more detailed representation of a user node from FIG. 1.

FIG. 6 shows a somewhat more detailed representation of user node 3. Memory element 10 may be developed as a volatile memory having random access (RAM). Individual memory areas of memory element 10 are used to store the data of first buffer FIFO0 and of second buffer FIFO1. Furthermore, another, separate memory area is provided, which forms a register system 111, in which the information about received message 7 is stored when step 107 is carried out.

In a departure from the specific embodiment shown, it is also possible to develop register system 111, not as a memory area of a RAM, but as a special register of communication module 4 or as a special register set of communication module 4. The two buffers FIFO0 and FIFO1 are organized by filter system 6 as FIFO memories. For this purpose, filter system 6 may have a write pointer for each buffer FIFO0, FIFO1, which indicates to which address within memory element 10 the messages 7, which are to be written into buffer FIFO0, FIFO1, are to be copied. Furthermore, a read pointer may be provided in filter system 6 for each buffer FIFO0, FIFO1, which indicates at which address within memory element 10 the message 7, which is to be read out according to the FIFO principle, is located.

Via an interface 113, application 5 has random access to individual words within memory element 10 such that, if required, it may access any messages 7 located in the two buffers FIFO0 and FIFO1, even if according to the FIFO principle they should not yet be read out of buffers FIFO0 or FIFO1. In this manner, application 5 is able to access received message 7 immediately, independently of the FIFO principle, on the basis of the information stored in register system 111, in particular the information indicating at which location the respective message 7 is located within the respective buffer FIFO0 or FIFO1, without first having to read out the messages 7 previously stored in buffer FIFO0, FIFO1. If filter elements 99 are inserted into the list, which ensure that information about particularly urgent messages 7 is stored in register system 111, then application 5 is able to react particularly quickly to these messages 7 because the application is able to process this message 7 prior to the messages 7 already stored previously in buffers FIFO0 or FIFO1. This may be accomplished for example by a suitable interrupt service routine within application 5.

In a specific embodiment that is not shown, the two buffers FIFO0 and FIFO1 are not implemented by a RAM, but rather by special hardware. The buffers implemented in special hardware are developed in such a way that application 5 is able to read out any messages 7 from these buffers in deviation from the FIFO principle.

Application 5 reads out received messages 7, for which no information was stored, from buffers FIFO0, FIFO1 according to the FIFO principle. For this purpose, application 5 may query buffers FIFO0, FIFO1 at regular intervals. Alternatively or additionally, there may be a provision for another interrupt request to be generated, which may be by communication module 4, if at least one buffer FIFO0, FIFO1 or a specific buffer FIFO0, FIFO1 has reached a specific filling level such that application 5 is able to access buffers FIFO0, FIFO1 in an interruption-controlled manner.

All in all, due to the utilized FIFO strategy, the method allows for a relatively simple processing of messages 7, which have very many different identifiers, while at the same time, by storing information about specific, which may be particularly urgent messages 7 (for example alarm messages), avoiding the disadvantages of communication modules 4 having FIFO buffers since it is not necessary to use the FIFO strategy for the urgent messages 7. When implementing the method, therefore, it is possible to combine the advantages of FIFO-based communication modules 4 with advantages of communication modules 4 that use so-called "dedicated buffers".

What is claimed is:

1. A method for storing information of messages coming in via a serial data bus of a communication network in a communication module of a user connected to the data bus, the method comprising:

filtering the messages using a filter system, the messages each having an identifier for identification and the properties of the filter system being defined by identifiers of messages stored in at least one list of the filter system, wherein the list has as list elements at least one filter element, which contains storage control information, wherein each filter element contains an identifier pair and information about an incoming message is stored only if the identifiers of the incoming message are contained within a range defined by the identifier pair;

configuring a setting for handling the incoming message if the identifiers are not contained within the range, wherein the setting is configurable to specify that the incoming message is to be rejected, and the setting is also configurable to specify that the incoming message is to be accepted for forwarding to an application of the user even though the identifiers are not contained within the range;

performing a check based on the storage control information as to whether information about an incoming message is to be stored;

storing information about an incoming message if the check reveals that the information is to be stored; and handling the incoming message by accepting or rejecting the incoming message in accordance with the configured setting if the identifiers of the incoming message are not contained within the range, wherein accepted incoming messages are stored at a location accessible by the application;

wherein the incoming message is stored in a FIFO buffer and the application has random access to individual messages stored via a suitable interface by which individual messages are accessed independently of the access to the individual messages that is provided to the application by the FIFO buffer, and wherein the FIFO buffer is one of a plurality of FIFO buffers in which the incoming message is storable, the information about the incoming message identifies which buffer the incoming message is stored in, and the application uses the information to perform a random access to the incoming message.

2. The method of claim 1, wherein information is stored about whether and at which storage location the message was stored and about whether the message was not stored due to a lack of storage space.

3. The method of claim 1, wherein, as information about the storage location, information is stored regarding in which buffer, and in particular in which location within the respective buffer, the message was stored.

4. The method of claim 1, wherein, if the information is stored, the application is notified by way of an interrupt request.

5. The method of claim 1, wherein a separate memory area is provided within the communication module for storing the information about the incoming message, which is stored in a different location than the incoming message itself.

6. The method of claim 5, wherein, following the storage of the information in the separate memory area, an interrupt request to the application is generated.

7. The method of claim 1, wherein an interrupt request to the application is generated as a function of the filling level of the buffers.

8. The method of claim 1, wherein multiple pairs of identifiers are stored in the at least one list of the filter system, which in each case define one range delimited by a first identifier and a second identifier and the identifier of an incoming message is compared at least to selected identifier pairs and a query is made as to whether the identifier of the incoming message is greater than or equal to the selected first identifier and smaller than or equal to the selected second identifier, and the incoming message is forwarded or rejected as a function of the result of this check.

9. The method of claim 1, wherein the application performs the random access to access urgent messages, before the urgent messages are available according to the order in which the urgent messages are stored in the FIFO buffers.

10. The method of claim 1, wherein a plurality of buffers are available for storing the incoming message, and a buffer is selected for storing the incoming message based on an importance of the incoming message.

11. The method of claim 1, wherein a plurality of buffers are available for storing the incoming message, and a buffer is selected for storing the incoming message based on a time-criticality of the incoming message.

12. The method of claim 1, wherein:
- a plurality of buffers are available for storing the incoming message;
- the incoming message is received by a gateway connected to different communication networks, the gateway including a plurality of channels for communicating with the communication networks; and
- a buffer is selected for storing the incoming message based on which channel the incoming message is intended to be sent through.

13. A filter system for storing information of messages coming in via a serial data bus of a communication network in a communication module of a user connected to the data bus, comprising:
- a filtering arrangement to filter the messages, the messages each having an identifier for identification and the properties of the filtering arrangement being defined by identifiers of messages stored in at least one list of the filtering arrangement, wherein the list has as list elements at least one filter element, which contains storage control information, wherein each filter element contains an identifier pair and information about an incoming message is stored only if the identifiers of the incoming message are contained within a range defined by the identifier pair;
- a configuration arrangement to configure a setting for handling the incoming message if the identifiers are not contained within the range, wherein the setting is configurable to specify that the incoming message is to be rejected, and the setting is also configurable to specify that the incoming message is to be accepted for forwarding to an application of the user even though the identifiers are not contained within the range;
- a checking arrangement to perform a check based on the storage control information as to whether information about an incoming message is to be stored; and
- a storing arrangement to store information about an incoming message if the check reveals that the information is to be stored, the storing arrangement handling the incoming message by accepting or rejecting the incoming message in accordance with the configured setting if the identifiers of the incoming message are not contained within the range, wherein accepted incoming messages are stored at a location accessible by the application;

wherein the incoming message is stored in a FIFO buffer and the application has random access to individual messages stored via a suitable interface by which individual messages are accessed independently of the access to the individual messages that is provided to the application by the FIFO buffer, and wherein the FIFO buffer is one of a plurality of FIFO buffers in which the incoming message is storable, the information about the incoming message identifies which buffer the incoming message is stored in, and the application uses the information to perform a random access to the incoming message.

14. The method of claim 13, wherein information is stored about whether and at which storage location the message was stored and about whether the message was not stored due to a lack of storage space.

15. The method of claim 13, wherein, as information about the storage location, information is stored regarding in which buffer, and in particular in which location within the respective buffer, the message was stored.

16. The method of claim 13, wherein, if the information is stored, the application is notified by way of an interrupt request.

17. The method of claim 13, wherein a separate memory area is provided within the communication module for storing the information about the incoming message, which is stored in a different location than the incoming message itself.

18. The method of claim 17, wherein, following the storage of the information in the separate memory area, an interrupt request to the application is generated.

19. The method of claim 13, wherein an interrupt request to the application is generated as a function of the filling level of the buffers.

20. The method of claim 13, wherein multiple pairs of identifiers are stored in the at least one list of the filtering arrangement, which in each case define one range delimited by a first identifier and a second identifier and the identifier of an incoming message is compared at least to selected identifier pairs and a query is made as to whether the identifier of the incoming message is greater than or equal to the selected first identifier and smaller than or equal to the selected second identifier, and the incoming message is forwarded or rejected as a function of the result of this check.

* * * * *